United States Patent
Morelli, Jr.

(10) Patent No.: US 9,483,285 B2
(45) Date of Patent: Nov. 1, 2016

(54) SYSTEMS AND METHODS OF OPTIMIZING RESOURCES FOR EMULATION

(71) Applicant: Sphere 3D Inc., Mississauga (CA)

(72) Inventor: Giovanni Morelli, Jr., Toronto (CA)

(73) Assignee: SPHERE 3D INC., Mississauga, Ontario (CA)

( * ) Notice: Subject to any disclaimer, the term of this patent is extended or adjusted under 35 U.S.C. 154(b) by 962 days.

(21) Appl. No.: 13/741,884

(22) Filed: Jan. 15, 2013

(65) Prior Publication Data
US 2013/0185048 A1    Jul. 18, 2013

(30) Foreign Application Priority Data
Jan. 16, 2012  (CA) .................................... 2764354

(51) Int. Cl.
G06F 9/455 (2006.01)
G06F 9/50 (2006.01)

(52) U.S. Cl.
CPC ............. *G06F 9/455* (2013.01); *G06F 9/5077* (2013.01)

(58) Field of Classification Search
CPC .. C07K 16/22; C07K 16/18; C07K 2317/76; C07K 2317/24; C07K 2317/92; A61K 39/3955; A61K 45/06; A61K 2039/505
USPC .......................................................... 703/27
See application file for complete search history.

(56) References Cited

U.S. PATENT DOCUMENTS

| | | |
|---|---|---|
| 5,341,477 A | 8/1994 | Pitkin et al. |
| 5,748,890 A | 5/1998 | Goldberg et al. |
| 6,389,379 B1 * | 5/2002 | Lin ..................... G06F 17/5027 703/14 |
| 6,750,885 B1 | 6/2004 | Finch et al. |
| 7,007,093 B2 | 2/2006 | Spicer et al. |
| 7,219,234 B1 | 5/2007 | Ashland et al. |
| 7,434,257 B2 | 10/2008 | Garg et al. |
| 7,568,217 B1 | 7/2009 | Prasad et al. |
| 7,580,826 B2 | 8/2009 | Vega et al. |
| 7,870,256 B2 | 1/2011 | Talwar et al. |

(Continued)

FOREIGN PATENT DOCUMENTS

| | | |
|---|---|---|
| EP | 998705 | 10/1997 |
| JP | 200057091 | 2/2005 |

OTHER PUBLICATIONS

How to redirect to a certain URL if a page returns an "access denied" message? Posted by DrupalCuckoo on Jul. 12, 2010 at 10:39am https://groups.drupal.org/node/50154.

(Continued)

*Primary Examiner* — Saif Alhija

(57) ABSTRACT

Methods and systems for providing an emulation session to emulate a computer product for a host device. A method and system involve providing a communication link between the host device and an emulation bridge module provided on an emulation server separate from the host device; providing a host resource library file including a list of the plurality of resources available on the host device to the emulation bridge module; operating the emulation bridge module to determine emulation session resources required to provide the emulation session; selecting at least one of the host device and the emulation server for providing each required emulation session resource in the emulation session resources required to provide the emulation session; and providing the emulation session using the required emulation session resources provided by at least one of the host device and the emulation server.

23 Claims, 3 Drawing Sheets

(56) References Cited

U.S. PATENT DOCUMENTS

| | | |
|---|---|---|
| 8,028,040 B1 | 9/2011 | Hobbs et al. |
| 8,141,075 B1 | 3/2012 | Chawla et al. |
| 8,175,863 B1 | 5/2012 | Ostermeyer et al. |
| 8,347,288 B1 | 1/2013 | Brandwine |
| 8,453,145 B1 | 5/2013 | Naik |
| 8,555,274 B1 | 10/2013 | Chawla et al. |
| 8,572,613 B1 | 10/2013 | Brandwine |
| 8,707,397 B1 | 4/2014 | Wilkinson et al. |
| 2005/0132220 A1 | 6/2005 | Chang et al. |
| 2006/0190238 A1 | 8/2006 | Autor et al. |
| 2007/0130305 A1 | 6/2007 | Piper et al. |
| 2010/0269046 A1 | 10/2010 | Pahlavan et al. |
| 2010/0299436 A1 | 11/2010 | Khalid et al. |
| 2011/0018883 A1 | 1/2011 | Sampath et al. |
| 2011/0055602 A1 | 3/2011 | Kamay et al. |
| 2011/0145574 A1 | 6/2011 | Ju et al. |
| 2011/0153716 A1 | 6/2011 | Malakapalli et al. |
| 2011/0246904 A1 | 10/2011 | Pinto et al. |
| 2011/0265009 A1 | 10/2011 | Eby et al. |
| 2012/0089980 A1 | 4/2012 | Sharp et al. |
| 2012/0110571 A1 | 5/2012 | Smith et al. |
| 2012/0297455 A1 | 11/2012 | Novak et al. |
| 2013/0055102 A1 | 2/2013 | Matthews et al. |
| 2013/0060837 A1 | 3/2013 | Chakraborty et al. |
| 2013/0076768 A1 | 3/2013 | Chakraborty et al. |
| 2013/0104125 A1 | 4/2013 | Sarma et al. |

OTHER PUBLICATIONS

International Search Report and Written Opinion dated Jul. 11, 2014, International Application No. PCT/CA2014/000301.
Response to Advisory Action dated Apr. 16, 2015, U.S. Appl. No. 13/742,585.
Advisory Action dated Apr. 16, 2015, U.S. Appl. No. 13/742585.
Response to Office Action dated Jan. 14, 2015, U.S. Appl. No. 13/742585.
Office Action dated Jan. 14, 2015, U.S. Appl. No. 13/742585.
Response to Office Action dated Jun. 23, 2014, U.S. Appl. No. 13/742,585.
Office Action dated Jun. 23, 2015, U.S. Appl. No. 13/742,585.
Office Action dated Mar. 10, 2015, U.S. Appl. No. 13/742,632.
Response to Office Action dated Mar. 10, 2015, U.S. Appl. No. 13/742,632.
Interview Summary dated May 29, 2015, U.S. Appl. No. 13/742,585.
Preliminary Amendment dated Jun. 10, 2015, U.S. Appl. No. 13/742,585.
Microsoft, "Remote Desktop Protocol", Retrieved from the Internet: URL: msdn.microsoft.com/en-ca/library/windows/desktop/aa383015(v=vs.85).aspx [retrieved on Apr. 8, 2013].
Microsoft, "Virtual Desktop Infrastructure", Retrieved from the Internet: URL: www.microsoft.com/en-us/server-cloud/windows-server/virtual-desktop-infrastructure.aspx [retrieved on Apr. 8, 2013].
Microsoft, "Remote Desktop Services in Windows Server 2008 R2", Retrieved from the Internet: URL: technet.microsoft.com/library/dd647502(WS.10).aspx [retrieved on Apr. 8, 2013].
Microsoft, "Microsoft Hyper-V Server 2012", Retrieved from the Internet: URL: www.microsoft.com/en-us/server-cloud/hyper-v-server/default.aspx [retrieved on Apr. 8, 2013].
Microsoft, "Virtualization Desktop Infrastructure, Windows Server 2012", Retrieved from the Internet: URL: download.microsoft.com/download/F/E/D/FED8C1A8-B146-4434-BE2E-A82CA9F26079/WS%202012%20White% 20Paper_VDI.pdf [retrieved on Apr. 8, 2013].
Microsoft, "Why Hyper-V?", Retrieved from the Internet: URL: download.microsoft.com/download/5/7/8/578E035F-A1A8-4774-B404-317A7ABCF751/Competitive-Advantages-of-Hyper-V-Server-2012-over-VMware-vSphere-Hypervisor.pdf [retrieved on Apr. 8, 2013 ].

* cited by examiner

SYSTEMS AND METHODS OF OPTIMIZING RESOURCES FOR EMULATION

This application claims foreign priority to Canadian Patent Application No. 2,764,364, filed on Jan. 16, 2012.

FIELD

The described embodiments relate to systems and methods for optimizing resources for emulation.

BACKGROUND

An emulation system operates to imitate a computer product in an emulation session. The imitated computer product can then be provided to a host device. The computer product can be a computer system, an operating environment, a software application, and/or one or more hardware and software components. The emulation system facilitates the emulation session by translating and processing instructions received from the host device into a format compatible with the emulated computer product.

The operation of existing emulation systems is limited. For example, certain operating systems require specific resources to be available in order to boot up. Emulation systems without access to these specific resources would not be able to emulate these operating systems. Android™-based devices, for example, require a camera component to boot up.

Emulation systems can, therefore, benefit from improved access to resources available at the host device.

SUMMARY

In accordance with an embodiment of the invention, there is provided a method of providing an emulation session to emulate a computer product for a host device, the host device comprising a host processor and a plurality of host resources. The method comprises the steps of: a) providing a communication link between the host device and an emulation bridge module provided on an emulation server separate from the host device, the emulation server comprising a server storage module and a server processor; b) providing a host resource library file including a list of the plurality of resources available on the host device to the emulation bridge module; c) operating the emulation bridge module to determine a plurality of emulation session resources required to provide the emulation session; d) selecting at least one of the host device and the emulation server for providing each required emulation session resource in the plurality of emulation session resources required to provide the emulation session, the step of selecting including: in response to determining a required emulation session resource corresponds to a resource listed in the host resource library file, selecting the host device for providing the required emulation session resource; and in response to determining a required emulation session resource does not correspond to a resource listed in the host resource library file, selecting the emulation server for providing the required emulation session resource; and e) providing the emulation session using the plurality of required emulation session resources provided by at least one of the host device and the emulation server.

In accordance with another embodiment of the invention, there is provided a system for providing an emulation session to emulate a computer product for a host device, the host device comprising a host processor and a plurality of host resources. The system comprises: a host bridge module for installing on the host device, the host bridge module being configured to operate the host processor when installed on the host device, to provide a host resource library file including a list of the plurality of resources available on the host device; and at least one emulation server comprising an emulation bridge module, a server storage module and a server processor; the at least one emulation server being separate from the host device and being configured to: determine a plurality of emulation session resources required to provide the emulation session; receive the host resource library file from the host bridge module via a communication link between the host device and the at least one emulation server; select at least one of the host device and the at least one emulation server for providing each required emulation session resource in the plurality of emulation session resources required to provide the emulation session; in response to determining a required emulation session resource corresponds to a resource listed in the host resource library file, select the host device for providing the required emulation session resource: in response to determining a required emulation session resource does not correspond to a resource listed in the host resource library file, select the emulation server for providing the required emulation session resource; and provide the emulation session using the plurality of required emulation session resources provided by at least one of the host device and the at least one emulation server.

In accordance with another embodiment of the invention, there is provided a method for providing an emulation session to emulate a computer product using at least one host resource of a plurality of host resources on a host device, the host device comprising a host processor. The method comprises: a) providing a host resource library file including a list of the plurality of resources available on the host device to an emulation server separate from the host device, the emulation server providing the emulation session; b) receiving, from the emulation server, a selected host resource list, the selected host resource list corresponding to a list of resources selected from the host resource library file to be provided by the host device for the emulation session: and c) enabling each host resource in the plurality of host resources corresponding to a resource in the selected host resource list to be accessible by the emulation server to provide the emulation session.

In accordance with another embodiment of the invention, there is provided a host device for providing at least one host resource for an emulation session to emulate a computer product provided by an emulation server, the emulation server being separate from the host device. The host device comprises: a host processor; a plurality of host resources comprising at least one of a hardware component and a software component; and a host bridge module configured to: provide a host resource library file including a list of the plurality of host resources available on the host device to the emulation server; receive, from the emulation server, a selected host resource list, the selected host resource list corresponding to a list of resources selected torn the host resource library file to be provided by the host device for the emulation session; and enable each host resource in the plurality of host resources corresponding to a resource in the selected host resource list to be accessible by the emulation server to provide the emulation session.

BRIEF DESCRIPTION OF THE DRAWINGS

A preferred embodiment of the present invention will now be described in detail with reference to the drawings, in which.

DETAILED DESCRIPTION OF EXEMPLARY EMBODIMENTS

Figure 1:
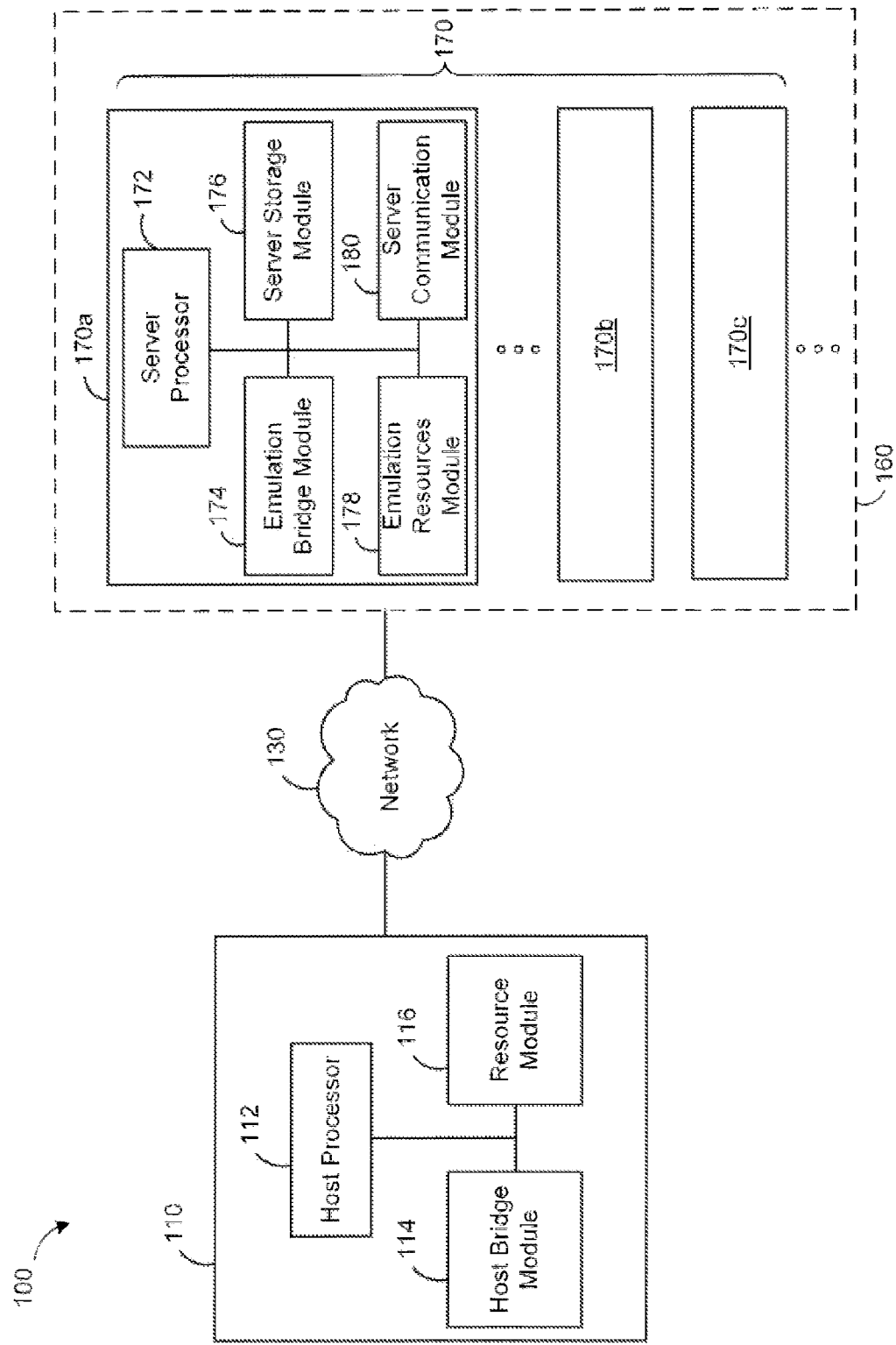
FIG. 1 is a block diagram illustrating a host device in communication with an emulation system, in accordance with an example embodiment.

The embodiments of the systems, processes and methods described herein can be implemented in hardware or software, or a combination of both. Alternatively, these embodiments can also be implemented in computer programs executed on programmable computers each comprising at least one processor (e.g., a microprocessor), a data storage system (including volatile and non-volatile memory and/or storage elements), at least one input device, and at least one output device. For example and without limitation, the programmable computers (referred to below as computing devices) can be a personal computer, laptop, personal data assistant, cellular telephone, smart-phone device, tablet computer, and/or wireless device. For any software components, program code is applied to input data to perform the functions described herein and generate output information. The output information is applied to one or more output devices.

Each software component or program can be implemented in a high level procedural or object oriented programming and/or scripting language to communicate with a computer system. However, the programs can be implemented in assembly or machine language, if desired. In any case, the language can be a compiled or interpreted language. Each such computer program is preferably stored on a storage media or a device (e.g. ROM) readable by a general or special purpose programmable computer, for configuring and operating the computer when the storage media or device is read by the computer to perform the procedures described herein. The subject system can also be considered to be implemented as a computer-readable storage medium, configured with a computer program, where the storage medium so configured causes a computer to operate in a specific and predefined manner to perform the functions described herein.

Furthermore, the processes and methods of the described embodiments are capable of being distributed in a computer program product comprising a computer readable medium that bears computer usable instructions for one or more processors. The medium can be provided in various forms, including one or more diskettes, compact disks, tapes, chips, wireline transmissions, satellite transmissions, internet transmission or downloadings, magnetic and electronic storage media, digital and analog signals, and the like. The computer useable instructions can also be in various forms, including compiled and non-compiled code.

It will be appreciated that for simplicity and clarity of illustration, where considered appropriate, reference numerals can be repeated among the figures to indicate corresponding or analogous elements.

In addition, numerous specific details are set forth in order to provide a thorough understanding of the embodiments described herein. However, it will be understood by those of ordinary skill in the art that the embodiments described herein can be practiced without these specific details. In other instances, well-known methods, procedures and components have not been described in detail so as not to obscure the embodiments described herein. Also, this description and the drawings are not to be considered as limiting the scope of the embodiments described herein in any way, but rather as merely describing the implementation of the various embodiments described herein.

The various embodiments described herein generally relate to a system (and related methods) for optimizing resources for an emulation session provided by an emulation server in an emulation system. The emulation session is provided for a host device. The host device includes one or more resources that can be available to be used for providing an emulation session. The host device can provide the emulation server with a list of available resources so that the emulation server can select to use any of the resources in that list that correspond to a resource required for providing the emulation session.

Reference is first made to FIG. 1, which illustrates a block diagram 100 of a host device 110 in communication with an emulation system 160.

As illustrated in FIG. 1, the host device 110 can communicate with the emulation system 160 over a network 130. For ease of exposition, only one host device 110 is illustrated in FIG. 1 but it will be understood that one or more host devices 110 can communicate with the emulation system 160 at any given time.

The host device 110 can generally be any computing device capable of network communication. For example, and without limitation, the host device 110 can be a personal computer, laptop, personal data assistant, cellular telephone, smart-phone device, tablet computer, and/or wireless device. The host device 110 can include one or more components or modules that operate based on software and/or hardware. For example, as illustrated in FIG. 1, the host device 110 includes a host processor 112, a host bridge module 114 and a resource module 116.

The host processor 112 can operate with one or more other modules on the host device 110 for enabling operation of the host device 110. Also, the host processor 112 can operate with the host bridge module 114 and/or the resource module 116 for identifying resources available at the host device 110 and enabling use of those resources for providing an emulation session.

The resource module 118 can include one or more software components and/or hardware components. The software components can include computer programs and/or applications that enable functionality on the host device 110. The software components can operate with and/or enable the hardware components to provide functionality. For example, the software components can include an e-mail client application, a calculator application and/or a camera processing application.

The hardware components can include any physical components that enable operation of the host device 110. For example, the hardware components can include a communication module for receiving and/or transmitting data with external components and/or other devices (e.g., via a USB connection, serial port connection, parallel port connection, HDMI port connection, radio-frequency connection, Bluetooth™ connection, a wireless connection, a mobile network connection, audio data connection, video data connection and any other data connections), a storage module (e.g., a hard disk drive, a random-access memory, and/or other computer data storage components), a navigation module (e.g., a Global Positioning System (GPS)), a multimedia module (e.g., a sound card, a video card, etc.), one or more user interface components (e.g., a touch screen, a keyboard, a display, etc.), and/or other modules for providing additional features (e.g., a motion detection module including a Gyroscope, etc.).

The network 130 can include a mobile network and/or the internet. In some embodiments, the network 130 can be a virtual channel within a remote desktop protocol (RDP) stack.

The host bridge module 114 can be provided as a software component. For example, the host bridge module 114 can be provided to the host device 110 over the network 130 or a pre-installed program on the host device 110.

The host bridge module 114 includes a host bridge application. The host bridge application can be a standalone software application, part of another software application, and/or built on a software development kit (SDK) available on the host device 110.

For example, the host bridge application can be provided onto the host device 110 as part of an installation of a mobile application, such as a word processor application, to be emulated on the Android system. When the mobile application is downloaded onto the host device 110, the host bridge application can be downloaded onto the host device 110 as part of that mobile application.

The host bridge module 114 can generally operate to identify resources available at the host device 110 and/or to enable one or more of the identified resources to be used by the emulation system 160 for providing an emulation session.

The resources available at the host device 110 can be provided as a list of resources in a host resource library file. The list of resources will generally include the software and hardware components provided in the resource module 116. In some embodiments, the hardware components can include a sound card, a camera, a keypad, a GPS module, Bluetooth module, a Near Field Communication module, and one or more other hardware modules, in some embodiments, the software components can include an e-mail client application, a calculator application, and one or more other software modules.

After the host bridge module 114 generates the host resource library file, the host bridge module 114 can store the host resource library file at the host device 110 in, for example, the storage module.

In some embodiments, the host bridge module 114 can request permission from a user of the host device 110 before being able to retrieve the list of resources. The host bridge module 114 can request access to the operating system of the host device 110 for retrieving the list of resources.

The host bridge module 114 can also request permission to access one or more other components available at the host device 110. For example, the host bridge module 114 can request access to the communication module in order to provide the host resource library file to the emulation system 160. In another example, the host bridge module 114 can request access to one or more hardware and/or software components within the resources module 116 so that these hardware and/or software components can be used by the emulation system 160 for providing an emulation session.

When the host bridge module 114 is denied permission by the user, the host bridge module 114 can respond accordingly. In some embodiments, the host bridge module 114 can generate an error message and display the error message on the user interface of the host device 110. In some further embodiments, the host bridge module 114 can also indicate to the emulation system 160 that any future emulation sessions that are requested by the host device 110 are to rely on resources provided by the emulation system 160 alone.

In some embodiments, the host bridge module 114 can provide a user interface from which user inputs can be received from a user of the host device 110 for customizing the content of the host resource library file. For example, the user inputs can include an input specifically designating resources that can be used by the emulation system 160 and resources that may not be used by the emulation system 160. The user inputs can further include an input for manually adding and/or removing resources from the host resource library file. The user input can further include an input for designating one or more resources within the host resource library file to be used for a particular emulation session. The user input can also include an input designating a communication port on the host device and/or communication protocol with which a resource on the host device can send and receive data from the emulation system 160. The communication protocol can include any known data communication protocols, such as Transmission Control Protocol (TCP)/Internet Protocol (IP), User Datagram Protocol (UDP), or Stream Control Transmission Protocol (SCTP).

The host bridge module 114 can designate the communication ports and/or communication protocols for a resource to be shared with the emulation system 160 based on a variety of factors. The variety of factors can include the operating system of the host device 110, availability of the communication ports on the host device 110, a level of power consumption by the resource to be used for providing the emulation session, and other operational factors.

The host bridge module 114 can also provide the host resource library file to the emulation system 160. By providing the host resource library file to the emulation system 160, the use and availability of resources that are required for an emulation session can be optimized and enhanced, in order to provide the host resource library file to the emulation system 160, the host bridge module 114 establishes communication with the emulation system 160 via the network 130.

As illustrated in FIG. 1, the emulation system 160 can include one or more emulation servers 170. The emulation servers 170 generally operate to provide an emulation session for emulating a computer product as identified in a request received from the host device 110.

Each emulation server 170 can be used for providing emulation sessions to the host device 110. An emulation server 170 can include a server processor, an emulation bridge module, a server storage module, an emulation resources module and a server communication module. For ease of exposition, only emulation servers 170a, 170b, and 170c are illustrated. It will be understood that a fewer or greater number of emulation servers could be provided in the emulation system 160.

The emulation system 160 can be a remote system connected to the host device over the network 130 such as the internet or a mobile network.

The example emulation server 170a includes a server processor 172, an emulation bridge module 174, a server storage module 176, an emulation resources module 178 and a server communication module 180. Emulation servers 170b and 170c can be similarly configured as the emulation server 170a.

The server processor 172 can operate with one or more other modules on the emulation server 170 for enabling operation of the emulation server 170. Also, the server processor 172 can operate with the emulation bridge module 174 and/or the emulation resources module 178 for determining resources required for providing an emulation session and for determining whether a resource can be provided by the host device 110.

The server storage module 176 can store data related to emulations that can be provided by the emulation server 170*a*. For example, the server storage module 176 can store one or more computer products to be provided in an emulation session by the emulation server 170*a* and also, a corresponding list of resources that are required for emulating any of those one or more computer products.

The server communication module 180 provides a communication interface for the emulation server 170*a*. The server communication module 180 can receive from and/or transmit data to external components and/or other devices.

The emulation bridge module 174 includes an emulation bridge application. The emulation bridge application enables communication between the host bridge module 114 on the host device 110 and the emulation server 170.

As described above, the host bridge module 114 can provide the host resource library file to the emulation system 160 so that the emulation system 160 can optimize use of any resources that can be available at the host device 110 for providing an emulation session. As a result, the emulation server 170 can minimize the resources that the emulation resources module 178 may need to emulate in order to provide an emulation session, and thus, can avoid wasting resources at the emulation server 170. Also, by using resources available at the host device 110, the emulation system 160 can extend the functionality and/or utility of an emulation session.

For example, in an emulation session requiring voice and/or audio data from a user at the host device 110, such as an emulated application for testing a telephone call or an emulated application involving voice recognition functions, the sound card resource on the host device 110 can be used in order to extend the functionality of that emulation session. In another example, an emulation session can be provided for testing an operability of a communication port, such as an HDMI port, at the host device 110.

Figure 2:
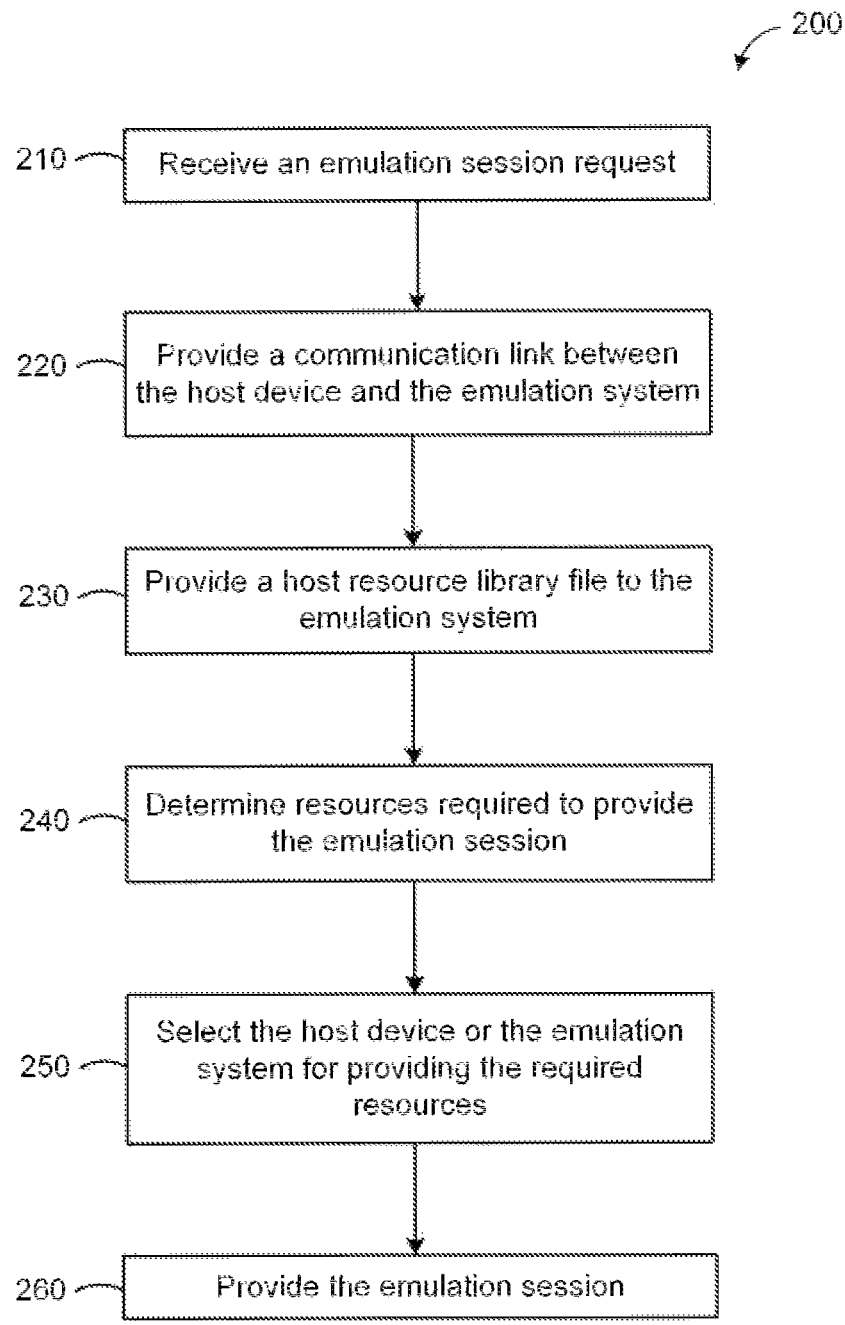
FIG. 2 is a flowchart illustrating a process for optimizing resources for an emulation session, in accordance with an example embodiment.

FIG. 2 is a flowchart 200 illustrating a process for optimizing resources for an emulation session.

At step 210, the emulation server 170 receives an emulation session request from the host device 110.

The emulation session request can include, at least, an identifier corresponding to a computer product that is to be emulated. In some embodiments, the emulation session request can be provided to the emulation server 170 when the host bridge module 114 receives and/or initializes the host bridge application. In some embodiments, the emulation session request can be provided to the emulation server 170 when the host device 110 receives a user input for initializing emulation of the computer product.

At Step 220, in response to receiving the emulation session request from the host device 110, a communication link can be provided between the host bridge module 114 and the emulation bridge module 174.

Generally, the emulation bridge module 174 communicates with the host bridge module 114 over the network 130. In some embodiments, the communication link can first be established between the host bridge module 114 and the emulation bridge module 174 before any data is provided between the host device 110 and the emulation server 170. For example, a communication link is successfully established if the host bridge module 114 sends a test signal to the emulation bridge module 164 and that test signal is appropriately returned from the emulation bridge module 164. In some further embodiments, the host bridge module 114 and the emulation bridge module 164 can continue to send each other synchronization signals in order to maintain the communication link for future data transfer.

At step 230, the host bridge module 114 can provide the host resource library file to the emulation bridge module 174.

As described above, the host resource library file can be provided to the emulation bridge module 174 via the communication link provided over the network 130.

At step 240, the emulation bridge module 174 determines emulation session resources required for providing the emulation session corresponding to the received emulation session request.

The received emulation session request includes, at least, an identifier corresponding to a computer product that is to be emulated. Using the computer product identifier provided in the received emulation session request, the emulation bridge module 174 can retrieve from the server storage module 176 a list of resources required for providing the emulation session for that computer product. In some embodiments, the list of resources can be retrieved by the server storage module 176 from an external database.

At step 250, the emulation bridge module 174 selects the host device 110 or the emulation server 170 for providing each of the resources required for providing the emulation session.

For each resource in the list of required resources, the emulation bridge module 174 determines it a corresponding resource is available at the host device 110 from the host resource library file. If the emulation bridge module 174 determines that a required resource corresponds to a resource in the host resource library file, the emulation bridge module 174 can select the resource in the host resource library file so that the host device 110 is selected for providing that required resource. However, if the emulation bridge module 174 fails to identify a resource in the host resource library file that corresponds to a required resource, the emulation bridge module 174 can select the emulation server 170 for providing that required resource. The emulation resources module 178 on the emulation server 170 can instead emulate that required resource.

In some embodiments, the emulation bridge module 174 provides the host bridge module 114 with a list of resources that the emulation bridge module 174 has selected the host device 110 to provide. On receipt of the list of resources, the host bridge module 114 can respond by initializing the selected resources.

In some embodiments, the host bridge module 114 can further configure the selected resources to be used for an emulation session. The host bridge module 114 can operate with the resource module 116 so that the selected resources have prioritized access to one or more hardware and software components in the resource module 116. For example, the host bridge module 114 can operate with a communication module in the resource module 116 so that the selected resources have prioritized access to the communication ports at the host device 110 for communicating with the emulation server 170. In another example, for an emulation session requiring voice data input from the user, the host bridge module 114 can configure the communication module so that data received by a microphone at the host device 110 has priority.

In some embodiments, the host bridge module 114 can further configure the selected resources to be used for an emulation session to be prioritize between one or more different emulation sessions. For example, the host device 110 can be connected to two concurrent emulation sessions that both require access to a microphone at the host device 110. The host bridge module 114 can configure the microphone so that one of the emulation sessions has prioritized access to the microphone over the other emulation session.

Figure 3:
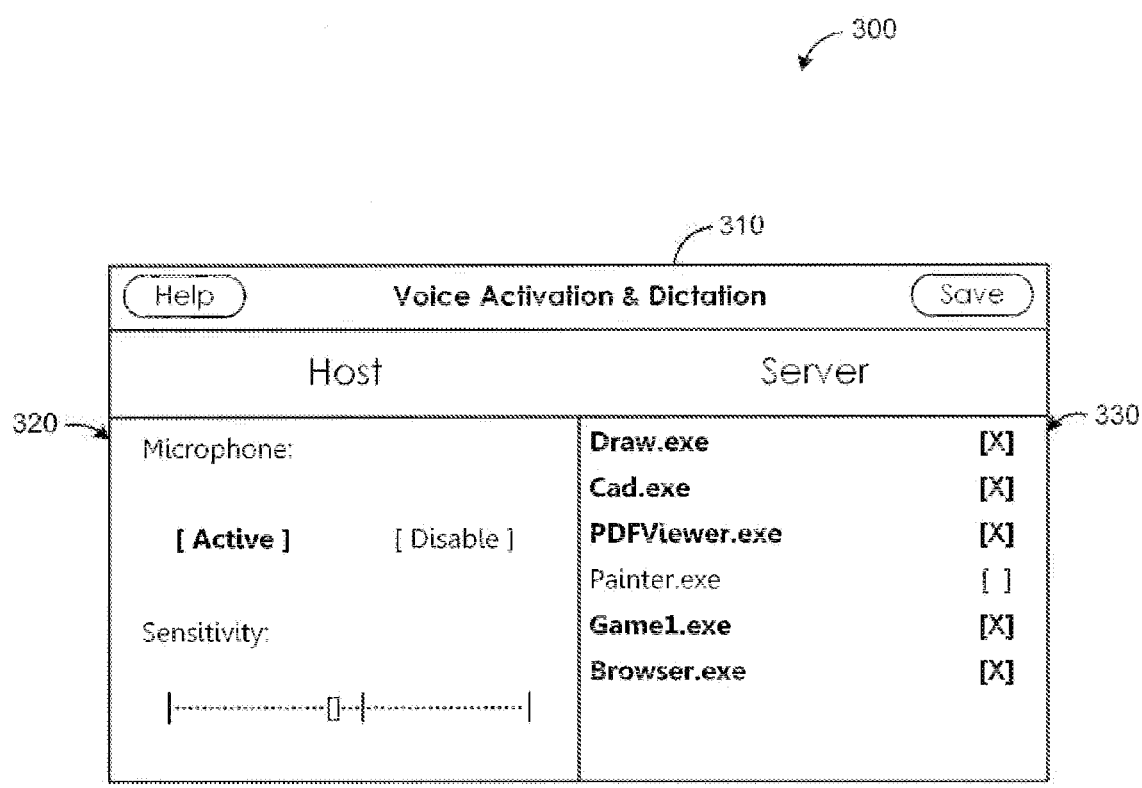
FIG. 3 is a screenshot of a device selection interface, in accordance with an example embodiment.

FIG. 3 illustrates a screenshot 300 of a device selection interface 310 for a dictation application provided at an emulation server 170. It will be understood that the illustrated user interface text and controls are provided as examples only and are not meant to be limiting. Other suitable user interface elements can be used.

The dictation application requires, at least, a microphone and one or more software components in order to operate. The resources used for providing the emulation session of the dictation application is generally illustrated as 320 for resources provided by the host device 110 ("Host") and generally illustrated as 330 for resources provided by the emulation server 170 ("Server"). As generally shown at 320, a microphone is available at the host device 110 and has also been selected by the emulation bridge module 174 for use in the emulation session of the dictation application. Similarly, as generally shown at 330, the software components for providing the dictation application is provided by the emulation server 170.

At step 260, the emulation server 170 provides the emulation session to the host device 110.

The emulation server 170 provides the emulation session corresponding to the received emulation session request using resources provided by the host device 110 and the emulation server 170, as determined at step 250. It will be generally understood that multiple emulation sessions can be provided on each emulation server 170 as long as sufficient resources are available.

In some embodiments, the emulation session can be provided using a Software Development Kit (SDK), the host device 110, an operating system of the emulation server 170, the host bridge module 114 including a host bridge application, and the emulation bridge module 174 including an emulation bridge application. The emulation session can be provided so that resources at the host, device 110 can be accessible to the emulation server 170. The emulation session can be enhanced from the limited options otherwise available from the host device 110.

In some embodiments, the host bridge module 114 can be installed on the host device 110. When the host bridge module 114 is initialized, the host bridge module 114 operates to search for resources on the host device 110 and to record a current host resource library file. The host bridge module 114 can also designate one or more of the resources on the host device 110 to be shared. The host bridge module 114 can prioritize access to any of the resources that have been designated to be shared between one or more emulation sessions and use for operations at the host device 110. The host bridge module 114 can designate one or more communication ports on the host device 110 and one or more communication protocols to be used for sharing a resource at the host device 110. To establish a communication link with the emulation system 160, the host bridge module 114 can set up and test a synchronization signal by sending the synchronization signal to the emulation bridge module 174.

In some embodiments, the emulation bridge module 174 can be installed on one of the emulation servers 170. When the emulation bridge module 174 is initialized, the emulation bridge module 174, can accept the synchronization signal from the host bridge module 114 and also receive the current host resource library file from the host bridge module 114. The emulation bridge module 174 can also indicate to the host bridge module 114 one or more desired resources at the host device 110 to be shared. The emulation bridge module 174 can prioritize access to the one or more resources to be shared from the host device 110 between use by one or more of applications to be provided in an emulation session and use by the emulation server 170. The emulation bridge module 174 can designate one or more communication ports on the emulation server 170 and one or more communication protocols to be used for using a resource at the host device 110.

In some embodiments, the user can select, at the emulation bridge module 174, one or more resources from the current host resource library file that can be to shared. The user can further select desired prioritization of access to these resources to be shared between use by one or more applications to be provided in emulation sessions and use by the emulation server. The user can further designate a communication interface, such as, e.g., a port and/or protocol, on the emulation server 170 for sharing the resource at the host device 110.

In some embodiments, the SDK can be installed on the emulation server 170. The host bridge module 114 can indicate to the SDK that one or more resources that are to be shared with the emulation server 170 exist at the host device 110 and are accessible through the emulation bridge module 174. The emulation bridge module 174 can provide an emulation operating system resource interface from which access to the one or more resources that are designated to be shared can be provided.

In some embodiments, the SDK can be installed in an operating system of a host device 110. The host bridge module 114 can provide an installation interface line variable for receiving inputs from a user of the host device 110 inputs for indicating that one or more resources can be shared. The resources that can be shared can be provided in an option list. The option list can be presented to the emulation server 170 and can be accessible via the emulation bridge module 174.

When the option list is received at the emulation server 170, the emulation bridge module 174 receives an indication that the resources in the option list (for example, a sound card for an emulation of a smartphone) exists at the host device 110 and therefore, do not need to be provided by the emulation system 160, the emulation bridge module 174 also receives a notification indicating that the one or more resources in the option list are accessible by the emulation bridge module 174, regardless of the communication interface of the emulation server 170 (for example, clipped pins to the emulation audio ports, restricted access from the emulation manager).

In some embodiments, an operating system of the emulation server 170 is designed to enable selections according to installation criteria of the SDK. The standard SDK set up can therefore be enhanced. For example, emulation sessions of applications that would otherwise stop loading due to the absence of a sound card, or an indication that the sound card is off, can now load and seek sound card resources via the emulation bridge module 174.

In some embodiments, the emulation bridge module 174 is set up after the host bridge module 114. The host bridge module 114 can be installed on the host device 110. The host bridge module 114 reviews the resources available at the host device 110 and records the current host resource library file. The current host resource library file can be accessible by the user of the host device so that the user can designate which of the resources in the resource module 116 can be shared with one or more emulation servers 170.

In some embodiments, the host bridge module 114 can also prioritize access to resources selected to be shared with the emulation server 170 between one or more emulation sessions and the host device 110 in accordance with a request received from the user.

In some embodiments, the host bridge module 114 can permit the user of the user device 110 to designate a communication interface, such as, e.g., a communication port and/or communication protocol, on the host device 110 for sharing the host resource. The types of communication ports can include serial, parallel, Bluetooth, wifi, USB, data, audio, video, networking, and com1. The types of communication protocols can include TCP, UDP, and SCTP.

In some embodiments, resources can be shared between the communication interfaces selected by the host bridge module 114 and the emulation bridge module 174. The communication interfaces can be selected from the set up options provided in each of the host bridge module 114 and the emulation bridge module 174. The SDK kit installation interface line variables can be modified according to the current host resource library file.

In some embodiments, resources at the host device 110 can be accessed as an extension of a function or an application to be provided by the emulation system 160 depending on a configuration of the emulation system 160, the host bridge module 114, and the emulation bridge module 174. For example, a sound card at the host device 110 can be used in an emulation session as a microphone and/or speaker when testing a telephone application, a voice recognition application, a gaming application, and so on.

In some embodiments, resources at the host device 110 can be accessed for control by a function or an application to be provided by the emulation system 160. For example, a HDMI output port at the host device 110 can be accessed for testing the ability of the emulation system 160 to control the HDMI output during an emulation session.

It will be understood that the systems and methods described above are flexible and can be modified for use with a wide range of communication interfaces, communication ports, and communication protocols and a large variety of host devices 110, SDKs, emulation sessions.

The present invention has been described here by way of example only. Various modification and variations can be made to these exemplary embodiments without departing from the spirit and scope of the invention, which is limited only by the appended claims.

The invention claimed is:

1. A method of providing an emulation session to emulate a computer product for a host device, the host device comprising a host processor and a plurality of host resources, the method comprising:
   a) providing a communication link between the host device and an emulation bridge module provided on an emulation server separate from the host device, the emulation server comprising a server storage module and a server processor;
   b) providing a host resource library file including a list of the plurality of resources available on the host device to the emulation bridge module;
   c) operating the emulation bridge module to determine a plurality of emulation session resources required to provide the emulation session;
   d) selecting at least one of the host device and the emulation server for providing each required emulation session resource in the plurality of emulation session resources required to provide the emulation session, the step of selecting including
      in response to determining a required emulation session resource corresponds to a resource listed in the host resource library file, selecting the host device for providing the required emulation session resource; and
      in response to determining a required emulation session resource does not correspond to a resource listed in the host resource library file, selecting the emulation server for providing the required emulation session resource; and
   e) providing the emulation session using the plurality of required emulation session resources provided by at least one of the host device and the emulation server.

2. The method of claim 1, wherein the plurality of host resources comprises at least one of a hardware component and a software component.

3. The method of claim 1, wherein a) further comprises providing a host bridge module on the host device, the host bridge module being configured to operate the host processor to generate the host resource library file; and communicating the host resource library file from the host bridge module to the emulation bridge module.

4. The method of claim 3, wherein a) further comprises providing a user selection list comprising at least one or more of the plurality of host resources, the user selection list comprising at least one of a hardware component and a software component;
   communicating the user selection list to a host device user using a host device user interface; and
   receiving feedback from the host device user regarding each resource in the user selection list, the feedback indicating whether or not to include that resource in the host resource library file.

5. The method of claim 3, wherein d) further comprises providing a selected host resource list to the host bridge module, the selected host resource list corresponding to a list of resources selected to be provided by the host device for the emulation session.

6. The method of claim 5, wherein d) further comprises:
   prioritizing access to the communication link between resources in the selected host resource list; and
   providing at least one resource in the selected host resource list with a highest access priority to the communication link, the highest access priority enabling the at least one resource to gain substantially immediate access to the communication link.

7. The method of claim 1, wherein at least one emulation session resource is selected from the host resource library file.

8. The method of claim 1 further comprising receiving, at the emulation bridge module, a request for the emulation session to emulate the selected computer product.

9. The method of claim 1, wherein the emulation server is remote from the host device.

10. The method of claim 9, wherein a) comprises establishing the communication link between the emulation server and the host device over the Internet.

11. A system for providing an emulation session to emulate a computer product for a host device, the host device comprising a host processor and a plurality of host resources, the system comprising:
   a host bridge module for installing on the host device, the host bridge module being configured to operate the host processor when installed on the host device, to provide a host resource library file including a list of the plurality of resources available on the host device; and
   at least one emulation server comprising an emulation bridge module, a server storage module and a server processor; the at least one emulation server being separate from the host device and being configured to:
   determine a plurality of emulation session resources required to provide the emulation session;
   receive the host resource library file from the host bridge module via a communication link between the host device and the at least one emulation server;
   select at least one of the host device and the at least one emulation server for providing each required emulation session resource in the plurality of emulation session resources required to provide the emulation session;
   in response to determining a required emulation session resource corresponds to a resource listed in the host resource library file, select the host device for providing the required emulation session resource;
   in response to determining a required emulation session resource does not correspond to a resource listed in the host resource library file, select the emulation server for providing the required emulation session resource; and
   provide the emulation session using the plurality of required emulation session resources provided by at least one of the host device and the at least one emulation server.

12. The system of claim 11, wherein the plurality of host resources comprises at least one of a hardware component and a software component.

13. The system of claim 11, wherein, when installed on the host device, the host bridge module is further configured to:
   operate the host processor to generate the host resource library file; and
   communicate the host resource library file to the emulation bridge module.

14. The system of claim 13, wherein, when installed on the host device, the host bridge module is further configured to:
   provide a user selection list comprising at least one or more of the plurality of host resources, the user selection list comprising at least one of a hardware component and a software component;
   communicate the user selection list to a host device user using a host device user interface; and
   receive feedback from the host device user regarding each resource in the user selection list, the feedback indicating whether or not to include that resource in the host resource library file.

15. The system of claim 13, wherein the emulation bridge module is configured to provide a selected host resource list to the host bridge module installed on the host device, the selected host resource list corresponding to a list of resources selected to be provided by the host device for the emulation session.

16. The system of claim 15, wherein, when installed on the host device, the host bridge module is further configured to:
   prioritize access to the communication link between resources in the selected host resource list; and
   provide at least one resource in the selected host resource list with a highest access priority to the communication link, the highest access priority enabling the at least one resource to gain substantially immediate access to the communication link.

17. The system of claim 11, wherein at least one emulation session resource is selected from the host resource library file.

18. The system of claim 11, wherein the emulation bridge module is configured to receive a request for the emulation session to emulate the selected computer product.

19. The system of claim 11, wherein the at least one emulation server is remote from the host device.

20. The system of claim 19, wherein the communication link between the at least one emulation server and the host device is provided over the Internet.

21. A method of providing an emulation session to emulate a computer product using at least one host resource of a plurality of host resources on a host device, the host device comprising a host processor, the method comprising:
   a) providing a host resource library file including a list of the plurality of resources available on the host device to an emulation server separate from the host device, the emulation server providing the emulation session;
   b) receiving, from the emulation server, a selected host resource list, the selected host resource list corresponding to a list of resources selected by the emulation server from the host resource library file to be provided by the host device for the emulation session; and
   c) in response to receiving the selected host resource list, determining whether the selected host resource list comprises at least one resource, and in response to determining the selected host resource list comprises the at least one resource, enabling each host resource in the plurality of host resources corresponding to a resource in the selected host resource list to be accessible by the emulation server to provide the emulation session, otherwise, receiving the emulation session via the emulation server.

22. A host device providing at least one host resource for an emulation session to emulate a computer product provided by an emulation server, the emulation server being separate from the host device, the host device comprising:
   a host processor;
   a plurality of host resources comprising at least one of a hardware component and a software component; and
   a host bridge module configured to:
      provide a host resource library file including a list of the plurality of host resources available on the host device to the emulation server;
      receive, from the emulation server, a selected host resource list, the selected host resource list corresponding to a list of resources selected by the emulation server from the host resource library file to be provided by the host device for the emulation session; and
      in response to receiving the selected host resource list, determining whether the selected host resource list comprises at least one resource, and in response to determining the selected host resource list comprises the at least one resource, enable each host resource in the plurality of host resources corresponding to a resource in the selected host resource list to be accessible by the emulation server to provide the emulation session, otherwise, receive the emulation session via the emulation server.

23. The method of claim 1 wherein the selecting at least one of the host device and the emulation server for providing each required emulation session resource in the plurality of emulation session resources required to provide the emulation session, the step of selecting including
   in response to determining a required emulation session resource corresponds to a resource listed in the host resource library file, selecting the host device for providing the required emulation session resource; and in response to determining a required emulation session resource does not correspond to a resource listed in the host resource library file, selecting the emulation server for providing the required emulation session resource;

further comprises, for at least one required emulation session resource in the plurality of emulation session resources, determining the required emulation session resource corresponds to a resource listed in the host resource library file, and then selecting the host device to provide the resource listed in the host resource library file as the at least one required emulation session resource; and for at least one additional required emulation session resource in the plurality of emulation session resources, determining the additional required emulation session resource does not corresponds to any resource listed in the host resource library file and then selecting the emulation server for providing the at least one additional required emulation session resource.

\* \* \* \* \*